United States Patent

Hurd et al.

[11] Patent Number: 6,129,010
[45] Date of Patent: Oct. 10, 2000

[54] TWIN SCREW PRECONDITIONER UNIT AND METHOD

[75] Inventors: Ronald D. Hurd, Plymouth; Stanley G. Liedman, Maple Grove; Ronald W. Hegner, Maple Plain; Daniel R. Green, Minnetonka, all of Minn.

[73] Assignee: General Mills, Inc., Minneapolis, Minn.

[21] Appl. No.: 09/334,908

[22] Filed: Jun. 17, 1999

Related U.S. Application Data

[62] Division of application No. 08/946,262, Oct. 7, 1997, Pat. No. 5,932,264.

[51] Int. Cl.$^7$ ................................. A21D 8/00; A23P 1/00
[52] U.S. Cl. ........................... 99/353; 99/349; 99/443 C
[58] Field of Search .............................. 99/349, 353–355, 99/348, 484, 485, 516, 534; 366/85, 97, 147, 149, 325.5, 300, 603, 195, 319, 291; 425/72.1, 310–314, 503, 437, 331, 381, 443, 465, 200, 203, 208, 204, 376.1; 426/496, 516, 507, 511, 523, 560, 615, 447, 448

[56] References Cited

U.S. PATENT DOCUMENTS

| | | | |
|---|---|---|---|
| 2,233,919 | 3/1941 | James | 99/353 |
| 2,263,301 | 11/1941 | James | 426/560 |
| 2,272,007 | 2/1942 | James | 425/314 |
| 3,700,467 | 10/1972 | Di Cecco | 426/615 |
| 3,828,661 | 8/1974 | Vink | 99/483 |
| 4,665,810 | 5/1987 | Falck | 99/348 |
| 4,748,037 | 5/1988 | Matsumoto et al. | 426/516 |
| 4,769,251 | 9/1988 | Wenger | 426/459 |
| 4,778,690 | 10/1988 | Sadel, Jr. | 426/560 |
| 4,790,996 | 12/1988 | Roush | 426/458 |
| 4,844,935 | 7/1989 | Fere et al. | 426/516 |
| 4,861,615 | 8/1989 | Wiedmann | 426/631 |
| 4,960,043 | 10/1990 | Van Legerich | 99/353 |
| 5,120,559 | 6/1992 | Rizvi | 426/446 |
| 5,304,000 | 4/1994 | Kowalczyk | 366/97 |
| 5,350,585 | 9/1994 | Sunderland | 426/19 |
| 5,433,490 | 7/1995 | Hurd | 285/360 |
| 5,641,529 | 6/1997 | Kunas | 426/516 |
| 5,652,009 | 7/1997 | Mair | 426/516 |
| 5,652,010 | 7/1997 | Gimmler et al. | 426/549 |
| 5,932,264 | 8/1999 | Hurd et al. | 426/511 |

FOREIGN PATENT DOCUMENTS 0294964  10/1996  European Pat. Off. .
0739593  10/1996  European Pat. Off. .

OTHER PUBLICATIONS

R.B. Fast, E.F. Caldwell Mar. 1990 Breakfast Cereals and How They Are Made pp. 75–77.
R.B. Fast, E.F. Caldwell, 1990, "Breakfast Cereals and How They are Made", 75–77, 1990.

*Primary Examiner*—Timothy Simone
*Attorney, Agent, or Firm*—John A. O'Toole; Douglas J. Taylor; Alan D. Kamrath

[57] ABSTRACT

A dry raw cereal material having a starch fraction is fed into the inlet (38) of a twin screw preconditioning unit (10). The dry material is rapidly advanced and mixed in the first two zones (31, 32) and conveyed into a third zone (33). Water is introduced by ducts (42) and is admixed with the dry material to form a well mixed wetted cereal material. The screws (14, 16) include blank segments (14c, 16c) having radially extending pins (40) to create a material plug in the barrel (30) of the preconditioning unit (10). Steam is added to the wetted material in the next zone (34) to form a heated wetted cereal material which is worked in the fourth zone (34) to form a heated precooked non-continuous cereal compacted dough material which is generally maintained below its gelatinization point. The dough material exits the outlet (41) of the preconditioning unit (10) and enters a low shear extended time cereal cooker (46) which finish cooks the dough material to a fully cooked cereal dough which is formed into desirably shaped and sized pellets.

20 Claims, 2 Drawing Sheets

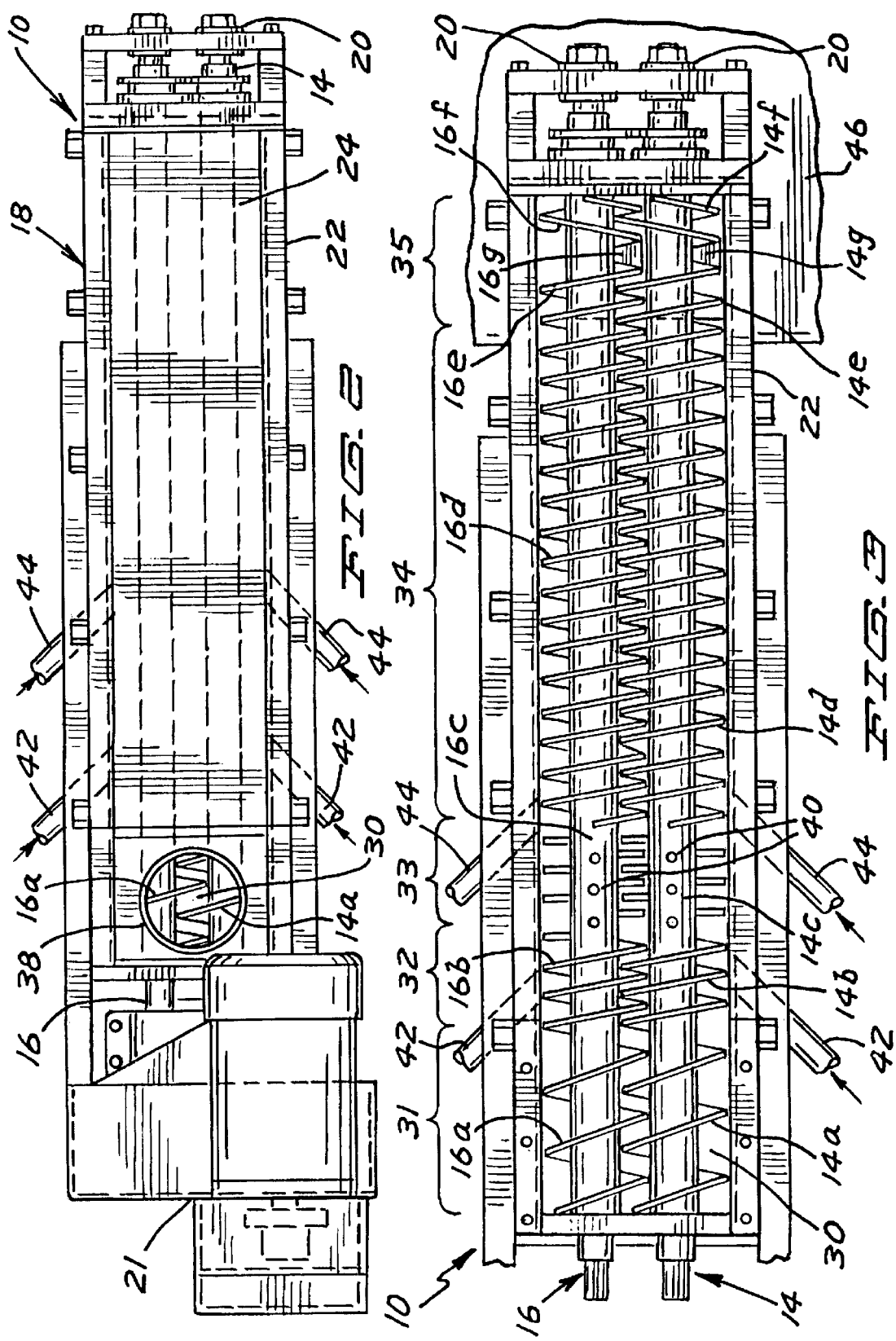

TWIN SCREW PRECONDITIONER UNIT AND METHOD

CROSS REFERENCE

The present application is a division of U.S. application Ser. No. 08/946,262 filed on Oct. 7, 1997 now U.S. Pat. No. 5,932,264.

FIELD OF THE INVENTION

The present invention relates to improved food processing apparatus for preparing cooked cereal doughs such as for Ready-To-Eat cereals and to improved methods for preparing cooked cereal doughs.

BACKGROUND

A wide variety of apparatus and methods are known in the art for the provision of cooked cereal doughs, to especially for ready-to-eat (RTE) cereal products. Such apparatus and methods convert a raw dry ungelatinized cereal material and water into a cooked cereal dough characterized by hydration and gelatinization of the starchy constituents of the cereal material. Important aspects of cereal cooking include not only the degree of gelatinization but also the texture of the cooked cereal dough.

A well known cereal cooking apparatus is known in the art as a James Cooker. The James Cooker provides a low shear, low pressure, extended time (e.g., 30 to 180 minutes) type of cooking yielding a cooked cereal dough that has a highly developed cooked flavor but has not experienced high amounts of shear. The dough is extruded under low shear through die plates with die holes to produce sized and shaped cooked cereal dough pellets. The basic design and operation of the James Cooker is described in U.S. Pat. No. 2,233,919 (issued Mar. 4, 1941 to T. R. James), U.S. Pat. No. 2,263,301 (issued Nov. 18, 1941 to T. R. James), and U.S. Pat. No. 2,272,007 (issued Feb. 3, 1942 to T. R. James), each of which is incorporated herein by reference. Over the years, various improvements have been made to the James Cooker (see, for example, U.S. Pat. No. 5,433,490, issued Jul. 18, 1995 to R. Hurd and S. Liedman which describes a quick change die mechanism especially useful for the James Cooker for the rapid change outs of plugged dies, also incorporated by reference herein).

The present invention provides further improvements in the James Cooker, namely; reductions in downtime, improvements in throughputs, and improvements in cook consistency and degree of control. The present invention involves mounting a twin screw preconditioning unit onto the inlet of the James Cooker for mixing, hydrating, heating and converting a cereal feed material into precooked crumbly dough material prior to feeding into the James Cooker.

James Cookers are typically run 24 hours a day in product runs from seven up to 21 or more days. During such extended production runs, however, the cookers frequently require being brought temporarily off-line due to plugging of the dies. Fouling or even plugging of the dies is most frequently caused by dry, hard dough balls in which the cereal material is incompletely cooked due to incomplete hydration of the cereal material. Changing out the die can require several hours before a clean die is in place and the cooker is brought up to steady state conditions. Such die change outs are required at unpredictable intervals and may happen several times a day. Also, a great quantity of food material that is inconsistently processed before the cookers reach steady state conditions must be discarded. In the '490 patent, this problem was addressed by an improvement in the outlet end of the James Cooker, namely, by providing a faster means for changing out the plugged dies.

However, the present invention provides an improvement in the inlet end of the James Cooker. Specifically, the present invention resides in part in adding a particular twin screw preconditioning unit. By adding the present twin screw preconditioning unit, improvements are obtained in the consistency of hydration of the cereal feed material. Such hydration consistency improvements lead to reductions in the incidence of die plugging from dry dough balls. Reductions in downtime alone and attendant material waste represent significant cost savings, especially over extended production runs. The present invention can be used alone or in combination with the quick die changer improvements described in the '490 patent.

Such further reductions in downtime due to fewer plugged dies provided by the twin screw preconditioning unit alone can result in productivity improvements of 10 to 20%.

In addition to reducing downtime, employment of a twin screw preconditioning unit increases significantly the throughput of such James Cookers. Conceptually, the James Cooker has three zones in its cooking section that 1) mixes the ingredients, 2) hydrates the mixture, and 3) cooks the hydrated mixture. In addition to its cooking section, the James cooker also includes a working section that works the cooked cereal material into a dough and extrudes the dough through the die plate to form cooked cereal dough pellets. The twin screw preconditioning unit performs the functions previously performed in the first two zones of cooking section of-the James Cooker allowing for a more rapid and thus higher throughput of cereal material. The improvements in throughput can range from 10 to 25%.

By both reducing downtime and by increasing throughput, the total increase in output can be from about 20 to 45% or even more. In view of the expense of such James Cookers, such increases in output lead to dramatic cost savings and increased productivity.

Of course, rotating paddle types of cereal preconditioners are known for use immediately upstream of high shear extruders (see for example, U.S. Pat. No. 5,120,559, issued Jun. 9, 1992 to S. H. Rizvi, U.S. Pat. No. 4,285,271, issued Aug. 25, 1981 to Falck et al; and/or U.S. Pat. No. 4,665,810, issued May 19, 1987 to Falck). However, such preconditioners generally involve the mere passive exposure to wet moist steam to accomplish hydration. Also, the output material from such preconditioners must necessarily be free flowing, granular and fluffy in order to feed the material to single or twin screw extruders, in contrast to the more dense compacted precooked cereal dough material that exits the twin screw preconditioning unit of the present invention.

Still another advantage of the present invention resides in the ability to control the consistency of the cooked dough with respect to both texture and flavor. Moreover, conventional cereal preconditioners, and even prior usage of the James Cooker, typically require close control of the particle size of the cereal material. Since such preconditioners and the James Cooker passively expose the material to wet steam, close attention to the surface area-to-volume ratio must be made to ensure proper hydration. In contrast, using the present twin screw preconditioning unit allows for employment of a wide variety of particle size feed materials without materially adversely affecting the ability to control the desired cooked dough's properties.

Similarly, the consistency of hydration of the cereal mixture by using the twin screw preconditioning unit also results in a more consistent cook in the James Cooker in addition to the reduction in the incidence of die plugging. A more consistent cook results in a gain in product quality and may result in enhanced flavor development in the dough which was not previously possible with the James Cooker alone. The degree of hydration obtained independent of particle size, the more consistent cook, and the other attributes resulting in the utilization of the twin screw preconditioning unit with the James Cooker reduce the variability of the operating parameters and lend to automatic control to further simplify operator interface in the preparation of cooked cereal doughs.

Improved methods for preparing cooked cereal doughs having special application in the production of RTE cereals according to the preferred teachings of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 2 shows a top plan view of the twin screw preconditioning unit of FIG. 1.

FIG. 3 shows a cross sectional view of the twin screw preconditioning unit of FIG. 1 according to section line 3—3 of FIG. 1.

Figure 1:
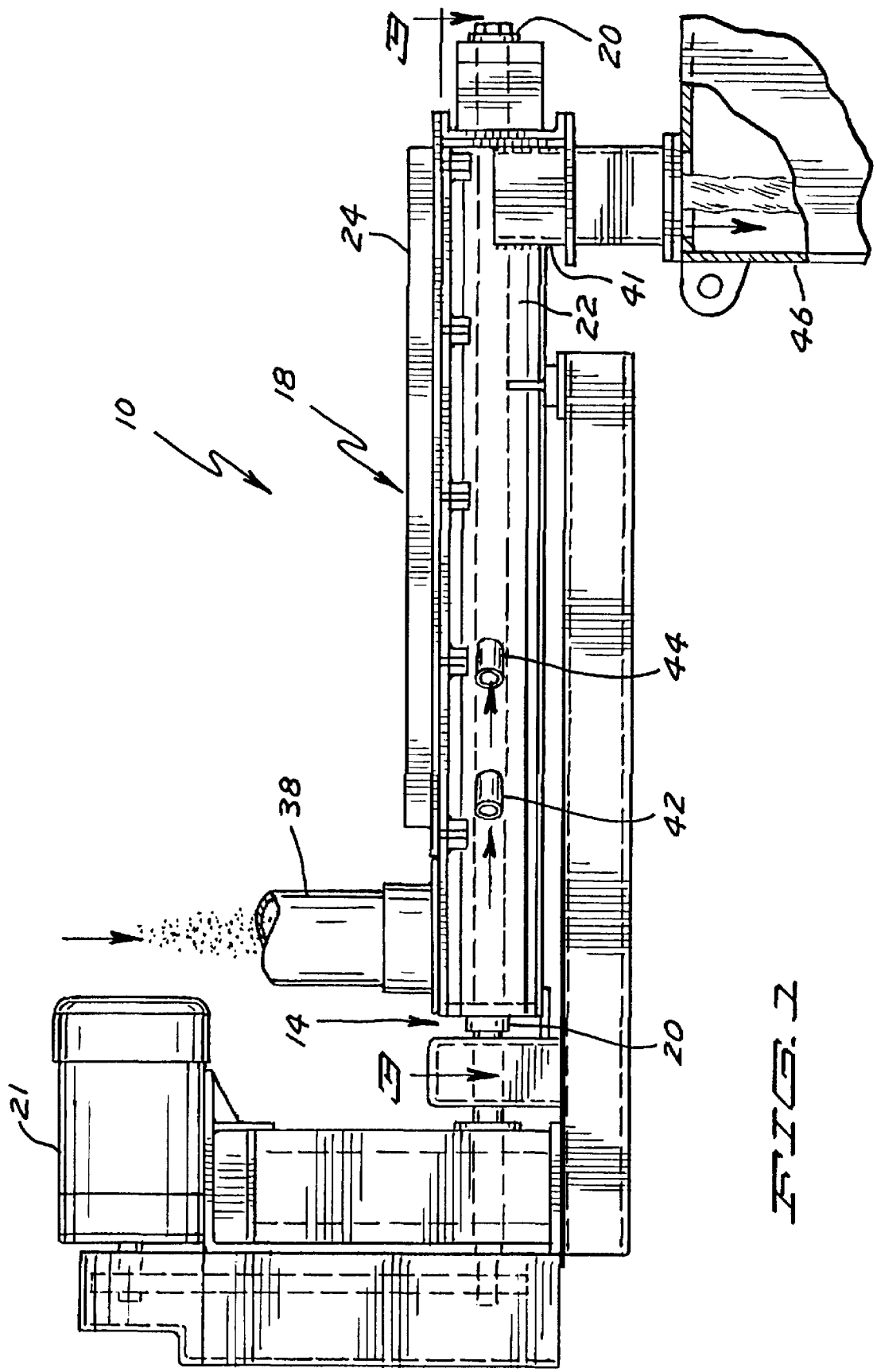
FIG. 1 shows a side elevational view of a twin screw preconditioning unit utilized in the preparation of cooked cereal doughs according to the preferred teachings of the present invention.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "first", "second", "length", "end"; "axial", "radial", "longitudinal", "upstream", "downstream", and similar terms are used herein, it should be understood that these terms have reference only to the structure shown in the drawings as it would appear to a person viewing the drawings and are utilized only to facilitate describing the illustrative embodiment.

DESCRIPTION

A twin screw preconditioning unit according to the preferred teachings of the present invention is shown in the drawings and generally designated 10. Generally, unit 10 is in the form of an extruder and includes substantially intermeshing screws 14 and 16 rotatably mounted inside of a housing assembly 18. In the most preferred form, housing assembly 18 is not jacketed. Screws 14 and 16 can include suitable seals and bearings 20 for rotatably mounting and sealing the shaft ends of screws 14 and 16 to housing assembly 18 to generally prevent feed materials and precooked dough from leaking along the shafts of screws 14 and 16. A suitable drive 21 can be provided such as at the upstream ends of the shafts of screws 14 and 16 for co-rotating screws 14 and 16 inside of housing assembly 18 and in the most preferred form is of the variable speed type.

Assembly 18 includes a barrel or channel 30 of a FIG. 8-shape of a size and configuration corresponding to intermeshing screws 14 and 16 and specifically providing minimal screw-to-barrel clearance when screws 14 and 16 are located in channel 30. Assembly 18 can be formed in any desired manner including utilizing conventional barrel sections. In the most preferred form, assembly 18 is formed by a first housing 22 of a generally U-shape and by a cover 24 of a generally planar shape which is removably secured to the upper edges of first housing 22.

For purposes of explanation, unit 10 and specifically screws 14 and 16 inside of channel 30 can be considered as including five functional zones 31–35, with the material moving downstream from zone 31 to zone 32, zone 32 to zone 33, etc.

First zone 31 of unit 10 is for feeding the dry raw feed material into barrel 30 and generally includes an inlet 38 formed in housing assembly 18. In the most preferred form, inlet 38 is formed in cover 24 and is cylindrical in shape having circular cross sections. Inlet 38 has a diameter generally equal to the maximum lateral extent between the shafts of screws 14 and 16 and is positioned with its lateral extent generally corresponding to the maximum lateral extent between the shafts of screws 14 and 16. Screws 14 and 16 include flights 14a and 16a within zone 31 for rapidly advancing dry material entering channel 30 of housing assembly 18 from inlet 38 into zone 32 and for very course mixing of the dry material. In the preferred form, the longitudinal extent of inlet 38 is within the longitudinal extent of flights 14a and 16a and in the most preferred form is less than the longitudinal extent of flights 14a and 16a with inlet 38 positioned at the upstream end of flights 14a and 16a.

Second zone 32 of unit 10 is for initial mixing and conveying the dry raw feed material from zone 31 to zone 33. Screws 14 and 16 include flights 14b and 16b within zone 32, with flights 14b and 16b having a radial extent equal to flights 14a and 16a but being of a greater pitch than flights 14a and 16a. Zone 32 in the preferred form has a longitudinal length slightly less that zone 31 and in the preferred form is generally two thirds the longitudinal length of zone 31.

Third zone 33 of unit 10 is for creating a material plug in barrel 30 and for further mixing the material. Screws 14 and 16 within zone 33 each include a blank segment 14c and 16c which is free of conveying flights. In the most preferred form, blank segments 14c and 16c each include a plurality of pins 40 extending radially from the shafts of screws 14 and 16 to a radial extent generally equal to that of flights 14a, b and 16a, b. In the most preferred form, three pins 40 are longitudinally spaced along the shafts every 90° around the shafts of screws 14 and 16. Additionally, in the most preferred form, pins 40 of screw 14 are positioned longitudinally intermediate pins 40 of screw 16, with the first pins 40 of screw 14 being positioned longitudinally upstream of the first pins 40 of screw 16, the second and third pins 40 of screw 14 being positioned intermediate the first and second and the second and third pins 40 of screw 16, and with the third pins 40 of screw 16 being positioned longitudinally downstream of the third pins 40 of screw 14. Zone 33 in the preferred film has a longitudinal length generally equal to but slightly less than the longitudinal length of zone 32.

Fourth zone 34 of unit 10 is for providing residence time for conditioning and precooking the material into a precooked dough material and for conveying the material from zone 33 to zone 35. Screws 14 and 16 include flights 14d and 16d within zone 34, with flights 14d and 16d in the most preferred form being of the same radial extent and pitch as flights 14b and 16b. In the most preferred form, zone 34 has a substantial longitudinal length which is slightly greater than one half of the total longitudinal length of barrel 30 of unit 10.

Fifth zone 35 of unit 10 is for allowing the exit of the conditioned precooked dough material from barrel 30 and generally includes an outlet 41 formed in housing assembly 18. In the most preferred form, outlet 41 is rectangular in shape having a lateral width generally equal to the lateral extent of barrel 30 and having a longitudinal width generally equal to the longitudinal extent of zone 35.

Screws 14 and 16 include flights 14e and 16e within zone 35, with flights 14e and 16e in the most preferred form being of the same radial extent and pitch and being continuous with flights 14d and 16d. Flights 14e and 16e have a longitudinal extent generally equal to but slightly less than one half that of zone 35 and outlet 41.

Screws 14 and 16 further include flights 14f and 16f within zone 35 and which are in a reverse direction of flights 14e and 16e and extend from the downstream end of barrel 30 towards the upstream end. In the most preferred form, flights 14f and 16f have the same radial extent and pitch as flights 14e and 16e (but reversed) and have a longitudinal extent generally equal to but slightly less one half that of zone 35 and outlet 41. The function of flights 14f and 16f is to generally prevent the precooked dough material from advancing to the downstream end of housing assembly 18. Material reaching the downstream end of housing assembly 18 may have a tendency to cause excessive wear in and/or to enter seals and bearings 20 for the downstream ends of screws 14 and 16.

Flights 14e and 14f and flights 16e and 16f are interconnected together by axially extending plates 14g and 16g which extend radially outward from the shafts of screws 14 and 16 to a radial extent equal to flights 14a, b, d, e, f and 16a, b, d, e, f. In the most preferred form, plates 14g and 16g are arranged at the same angular position on screws 14 and 16 in barrel 30. It can be appreciated that the pressure of the precooked dough material entering zone 35 drops as it leaves flights 14e and 16e and prior to its exiting through outlet 41. In the preferred form, the longitudinal length of zone 35 is generally equal to the longitudinal length of zone 32.

Unit 10 further includes provisions for introducing moisture and solutions into barrel 30 and the material being conveyed by screws 14 and 16. In the moat preferred form, housing assembly 18 of unit 10 includes a pair of ducts 42 formed adjacent to the downstream end of zone 32 and another pair of ducts 44 formed adjacent to the upstream end of zone 34. In the most preferred form, ducts 42 and 44 extend at a decreasing acute angle in the order of 45° relative to the axes of screws 14 and 16 in the flow or movement direction of the material and in a plane generally parallel to a plane including the axes of both screws 14 and 16.

Outlet 41 of twin screw preconditioning unit 10 is directly connected to the inlet of a conventional James Cooker 46 according to the preferred teachings of the present invention. In particular, James Cooker 46 can be of the form shown and described in U.S. Pat. Nos. 2,233,919; 2,263,301; 2,272,007; and 5,433,490. However, it is believed that unit 10 can be utilized and can have special application for other low shear, low pressure, (0 to 100 psig) extended time type of cooking apparatus. In the most preferred form, unit 10 is mounted directly to the frame of James Cooker 46 and can extend over, in front of, or to either side of James Cooker 46.

Now that the basic construction of unit 10 according to the preferred teachings of the present invention has been set forth, improved methods for preparing cooked cereal doughs such as for RTE cereal products can be explained in the most preferred form utilizing unit 10 of the present invention. In particular, drive 21 can be actuated to rotate screws 14 and 16 inside of housing assembly 18. Dry raw feed material is introduced into inlet 38 in any suitable manner, with the feed material in the preferred form being at ambient temperatures in the order of 50 to 120° F. (10 to 50° C.) depending upon season, plant location, storage conditions, etc.

Useful herein for the cereal feed materials are a wide variety of cereal materials derived from such common cereal as wheat, barley, oats, corn, triticale or other cereal grains and mixtures thereof. The cereal feed materials, of course, can also optionally include conventional cereal ingredients such as salt, minerals, malt syrup, sugar(s), fiber (e.g., bran, cellulose, pectin, psyllium), vitamins, flavor and colorants.

In a preferred embodiment, the cereal feed materials comprise a whole grain ingredient, e.g., soft wheat or whole oats. In other embodiments, various cereal feed materials such as cereal flours (whether whole grain or a cereal flour fraction) or cut cereal pieces can be used.

The particle size of the cereal feed materials is not critical, and it is an advantage of the present invention that the particle size can vary without materially adversely affecting the cooked cereal dough products obtained. Useful herein are flours, grits, flakes and other sizes and shapes of grain or cereal materials.

The dry feed material introduced into inlet 38 falls into and engages flights 14a and 16a which quickly convey the dry feed material from zone 31 to zone 32. The dry feed material is very coarsely mixed while being conveyed by flights 14a and 16a.

Due to the greater pitch of flights 14b and 16b, the dry feed material is mixed while being conveyed by flights 14b and 16b and obtains further fill in the FIG. 8-shape of barrel 30. While in zone 32, the dry feed material is admixed with sufficient amounts of water introduced into barrel 30 through ducts 42 in the preferred form at a temperature in the order of 90 to 120° F. (30 to 50° C.). While in zone 32, the dry feed material and water are mixed to form a well mixed wetted cereal feed material having a moisture content of about 25 to 40%.

Optionally, the present methods can additionally include the step of adding a sugar solution to the wet mixture to provide a sweetened mixture having a sucrose content of between about 1 to 5%. Such sugar solution could be added with the water through ducts 42 or could be added separately such as through further ducts. A portion of the total moisture content is thus provided by the sugar solution.

It should be noted that the provisions of flights 14a, b and 16a, b of differing pitches is advantageous in keeping zone 31 dry and in particular from keeping water and other solutions introduced into zone 32 such as though ducts 42 from entering zone 31 and particularly from reaching inlet 38. If moisture reaches inlet 38, bridging of inlet 38 by the feed material can occur which requires operator attention and reduces operation efficiency. Specifically, according to the preferred teachings of the present invention, ducts 42 introduce the water and solutions adjacent to the downstream end of zone 32 so that the feed material substantially fills barrel 30 to prevent an unobstructed passage to inlet 38.

Additionally, as flights 14a and 16a rapidly advance the feed material into zone 32, the feed material is available to absorb and intermix with the water and solutions which are then not free to continue to travel upstream towards inlet 38.

Flights 14b and 16b deliver the well mixed wetted feed material to blank segments 14c and 16c. As blank segments 14c and 16c are free of flights, rotation of screws 14 and 16 does not result in movement of the wetted feed material in zone 33. Rather movement of the wetted feed material is caused by the subsequent introduction of wetted feed material into blank segments 14c and 16c. Thus, the wetted feed material tends to fill barrel 30 in zone 33 and forms a plug which moves downstream.

Rotation of screws 14 and 16 causes pins 40 to rotate in the moving plug in zone 33. Pins 40 passing through the wetted feed material further mixes the wetted feed material in zone 33 and specifically within the longitudinal extent of blank segments 14c and 16c. As the wetted feed material is pushed through zone 33 by the subsequent introduction of additional feed material, it enters zone 34 and is engaged by flights 14d and 16d. Thus, the rotation of screws 14 and 16 causes flights 14d and 16d to convey the heated well mixed wetted feed material downstream.

Thereafter, steam is added to the well mixed wetted cereal material by its introduction into barrel 30 through ducts 44 in the preferred form. Steam is added in sufficient amounts to form a heated wetter feed material having a temperature of about 180 to 220° F. (82 to 104° C.), preferably about 190 to 215° F. (88 to 102° C.) and most preferably about 210 to 215° F. (99 to 102° C.) The steam can be any type of steam and conveniently is wet, intermediate pressure (30 to 60 psig, 310 to 515 kPa.) steam. The steam, upon condensation, provides about one part in 10 of the required moisture.

The steam provides substantially all of the heat for cooking of the well mixed wetted cereal material into the precooked dough material, with radiant and conductive heat also arising by virtue of the close proximity to James Cooker 46 and by virtue of mechanical energy.

It should then be appreciated that the material plug formed in blank segments 14c and 16c functions as a plug for preventing steam introduced through ducts 44 from passing upstream and specifically through zone 33 and into zones 31 and 32. It can be appreciated that loss of steam through inlet 38 is undesirable for several reasons including but not limited to increased operational costs, difficulties in introducing the raw feed material into inlet 38, and increased safety hazards and concerns for surrounding personnel and equipment.

Due to the increased temperature provided by the steam, it can be appreciated that the heated wetted feed material will be worked, cooked or otherwise conditioned while it moves through zone 34 due to the rotation of flights 14d and 16d. Specifically, the heated wetted feed material will turn into a precooked dough material generally prior to its entry into zone 35.

The precooked dough material, while heated, is importantly below its complete gelatinization point and thus does not constitute a fully cooked gelatinized cereal dough. Rather, the dough material is characterized by being hydrated, warmed and precooked.

The extent of cooking and various characteristics of a starchy material are frequently analyzed and described in the art using a Rapid Viscosity Analyzer ("RVA"). The RVA instrument subjects a sample material admixed with cold (25° C.) water, heats the sample during a prescribed time/ temperature regimen and measures the viscosity of the material/water sample over time and temperature. The viscosity is expressed in Rapid Visco Units (nRVUn, generally 1 RVU=11.9 centipoise.) over time to provide a pasting curve. The peak value on the curve "peak pasting value" is thus expressed in RVU units. Generally, a raw cereal flour will have a peak pasting value of about >700 RVU indicating no gelatinization. The finished cooked cereal doughs herein are characterized by peak pasting values ranging from about 150 to 300 RVU indicating substantially complete gelatinization. The precooked dough material exiting twin screw preconditioning unit 10 is essentially characterized by peak pasting curve values ranging from about 300 to 500 RVU.

Another alternate way of expressing the desirable degree of cooking herein is the percentage of starch that is completely gelatinized. The present precooked dough material exiting twin screw preconditioning unit 10 is essentially characterized by a gelatinized starch fraction ranging from about 20 to 60% and preferably about 30 to 60%.

Upon complete gelatinization, a cooked cereal dough is transformed into a continuous material having a viscosity that is several orders of magnitude greater than the uncooked, ungelatinized dough material exiting twin screw preconditioning unit 10. When this transition occurs, the torque load on the motor driving the twin screw shafts increases dramatically. Depending upon the working capacity of the electric motor driving the shafts, the motor can undesirably cut-out completely leading to a freeze up of the system. Moreover, a fully gelatinized dough is difficult to feed into the inlet of James Cooker 46 by gravity feed from the discharge of twin screw preconditioning unit 10.

The precooked dough material leaving zone 34 enters into zone 35 where it exits unit 10 through outlet 41. It should be appreciated that due to the provision of plates 14g and 16g and reversed flights 14f and 16f, the pressure of the precooked dough material exiting outlet 41 is reduced from the pressure of the precooked dough material just before leaving zone 34.

The precooked dough material exiting twin screw preconditioning unit 10 has a temperature of about 180 to 220° F. (82 to 104° C.), preferably about 190 to 215° F. (88 to 102° C.) and most preferably about 210 to 215° F. (99 to 102° C.). The precooked dough material has a moisture content of about 27 to 40%, preferably about 30 to 38%.

The precooked dough material is compacted and crumbly and has a density that ranges from about 70 to 80 lb./ft$^3$. (1.12 to 1.28 g/cc), and preferably about 1.13 to 1.17 g/cc.

In contrast, precooked cereal material exiting a conventional paddle type preconditioner is lighter in density (60 to 65 lb./ft$^3$.), different in texture (i.e., is pulverant and free flowing) and is lower in the percentage of gelatinization (i.e., <15%). These differences inherently result from the differences in design and operation of a paddle type preconditioner. In a paddle type preconditioner, the rotating paddles toss the cereal material upwards thereby exposing the suspended material to the wet steam environment. If the paddle shaft is turned too slowly, the material is not thrown upwards. If the material is gelatinized too much, then the cereal material becomes sticky and begins to stick to the paddles and is not thrown upwards to further hydrate and further gelatinize. As a result, the upper limit on the percentage of gelatinization is less than that obtained in twin screw preconditioning unit 10 of the present invention.

The residence time within twin screw preconditioning unit 10 according to the preferred teachings of the present invention is very brief, ranging on the order of about 10 to 30 seconds, and preferably about 10 to 20 seconds. Such a short processing time is in part due to the rapid absorption of steam by the cereal material by virtue of the steam being added after the material is thoroughly wetted, Specifically, the-injection of steam into ducts 44 of unit 10 according to the teachings of the present invention provides key attributes which dramatically improve the cooking process. Particularly, exceptional and quick ingredient hydration occurs within the residence time in unit 10 as compared to the thirty or more minutes which were required in James Cooker 46 alone. Also, exceptional and quick preheating of the dough material to saturation temperatures occurs within the residence time in unit 10 as compared to the thirty or more minutes which were required in James Cooker 46 alone.

The operating pressure within twin screw preconditioning unit 10 of the preferred form of the present invention is much lower than on a conventional cooking twin screw extruder and ranges from about 1 to 5 psig (108 to 136 kPa), and preferably about 1 to 2 psig (115 to 136 kPa).

The present precooked cereal dough material exiting twin screw preconditioning unit 10 has a pourable, or crumbly or discontinuous consistency. The precooked cereal dough material forms a compacted dough as compared to a continuous dough exiting the James Cooker. Also, the crumbly precooked dough material is distinguishable from the free flowing pulverant material that is prepared from a conventional preconditioner.

Thereafter, the precooked (or equivalently herein, "parcooked" or "partially cooked") cereal dough material exiting twin screw preconditioning unit 10 is fed directly, such as by gravity falling, into the inlet of James Cooker 46. The precooked cereal dough material is then finished cooked for about 30 to 90 minutes, preferably on the order of about 50 to 70 minutes, at about 220 to 240° F. without shear to form a fully cooked cereal dough.

This represents a greatly improved performance capability of James Cooker 46 over James Cooker 46 utilized alone which had a total residence time preferably on the order of 70 to 90 minutes. This improved performance is due to the complete material premixing with steam and the precooking obtained by twin screw preconditioning unit 10 according to the teachings of the present invention. In particular, the zones of the cooking section of James Cooker 46 previously utilized to mix and hydrate the feed material are freed to be used for cooking as the precooked dough material leaving outlet 41 of unit 10 of the present invention is thoroughly mixed and hydrated. Thus, use of unit 10 of the present invention effectively increases the cooking length of James Cooker 46 by the length previously required to mix and hydrate the material, which could be one third of the length of James Cooker 46. Increased cooking length of James Cooker 46 provides increased flexibility for both product enhancement and equipment operation.

Operation of twin screw preconditioning unit 10 according to the preferred teachings of the present invention has resulted in the recognition of several advantages in the methods for preparing cooked cereal doughs and in the preferred form of unit 10 of the present invention. Specifically, it has been found that the arrangement of ducts 42 and 44 according to the preferred teachings of the present invention is particularly advantageous. First, the decreasing angle of ducts 42 and 44 reduces the tendency of material moving in barrel 30 by the rotation of screws 14 and 16 from backing into and plugging or otherwise blocking ducts 42 and 44. Additionally, the preferred positioning of ducts 42 is sufficiently downstream of inlet 38 and zone 31 so that the material upstream of duct 42 and within zone 32 generally prevents passage of moisture to zone 31 of unit 10. Likewise, the preferred positioning of ducts 44 in the upstream end of zone 34 insures that the wetted feed material in blank segments 14c and 16c creates a material plug for preventing steam introduced through ducts 44 from passing there beyond while presenting sufficient residence time in zone 34 to arrive at precooked dough material of the desired characteristics.

Still another advantage of the present invention is that increases in output are obtained without increasing the footprint of the equipment in an existing facility.

Still another advantage resides in the safety of the combination of twin screw preconditioning unit 10 with James Cooker 46. Previously, when particulate feed material is fed to James Cooker 46, the steam and humidity can cause the particulate material to block or to form a bridge across the inlet of James Cooker 46. Such blocking or bridging required the operator to attempt to break the bridge using a stick. Once broken, the pressure within James Cooker 46 can cause a sputtering of the steam and hot materials. Frequently, such sputtering would cause burning or other operator injury. By directly feeding the output from twin screw preconditioning unit 10 to James Cooker 46, such bridging is substantially eliminated, thereby greatly reducing the incidence and severity of operator injury.

Still another advantage is that by directly connecting the output of twin screw preconditioning unit 10 to the inlet of James Cooker 46, atmospheric contamination of the cooked material is eliminated.

Still another advantage is that by directly connecting the output of twin screw preconditioning unit 10 to the inlet of James Cooker 46, spillage lose in charging James Cooker 46 is essentially eliminated.

Still another advantage is that since a significant amount of the processing occurs in twin screw preconditioning unit 10, James Cooker 46 can be brought up to desired steady state conditions faster than James Cooker 46 alone, leading to further improvements in productivity and output. Similarly, for the same reasons, changeovers and shutdowns can be performed quickly.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning of the claims are equivalency of the claims and are intended to be embraced therein.

What is claimed is:

1. Twin screw extruder comprising, in combination: a housing assembly including a channel adapted to receive intermeshing screws; first and second intermeshing screws located in the channel and rotatably mounted in the housing assembly; an inlet formed in the housing assembly for the introduction of material into the channel; an outlet formed in the housing assembly for exiting of conditioned material from the channel, with the first and second screws including an inlet zone for conveying material from the inlet towards the outlet, an operative zone for conditioning the material moving between the inlet and the outlet, and an outlet zone moving the conditioned material through the outlet; a first duct for introducing steam into the channel in the operative zone of the screws; and means in the channel upstream of the first duct for creating a material plug in the channel for generally preventing steam introduced through the first duct from passing upstream therebeyond.

2. The twin screw extruder of claim 1 wherein the creating means comprises blank segments in the first and second screws and which do not result in movement of the material as the result of rotation of the first and second screws.

3. The twin screw extruder of claim 2 further comprising, in combination: a plurality of pins extending radially from the first and second screws and within the blank segments for mixing the material in the blank segments.

4. The twin screw extruder of claim 3 wherein the inlet is adapted for the introduction of dry material into the channel; and wherein the twin screw extruder further comprises, in combination: a second duct for introducing water into the channel upstream of the material plug.

5. The twin screw extruder of claim 4 wherein the first and second screws include a mixing zone intermediate the inlet zone and the material plug for mixing the material, with the second duct introducing the water into the channel within the mixing zone.

6. The twin screw extruder of claim 5 wherein the inlet zone and the mixing zone of the screws are defined by flights, with the inlet having a longitudinal extent within the inlet zone, with the flights of the mixing zone being at a greater pitch than the flights of the inlet zone to generally keep the water introduced through the second duct from entering the inlet zone.

7. The twin screw extruder of claim 6 wherein the first and second ducts extend at a decreasing acute angle relative to the axes of the screws in the direction of movement of the material in the channel for reducing the tendency of material from backing into and plugging the first and second ducts.

8. The twin screw extruder of claim 7 wherein the first and second ducts extend at an angle in the order of 45°.

9. The twin screw extruder of claim 8 wherein the first and second ducts each include a pair, with the pair located in a plane generally parallel to a plane including both of the axes of the first and second screws.

10. The twin screw extruder of claim 9 wherein the outlet zone is defined by first flights continuous with the operative zone for moving the conditioned material downstream in the channel and second flights for moving the conditioned material upstream in the channel, with the first and second screws including downstream ends, with the second flights extending from the downstream ends of the screws toward the inlet.

11. The twin screw extruder of claim 10 wherein the outlet zone further includes plates extending axially between and interconnecting the first and second flights.

12. The twin screw extruder of claim 11 further comprising, in combination: a low shear, low pressure, extended time type cooker having an inlet directly connected to the outlet of the channel.

13. The twin screw extruder of claim 1 wherein the first duct extends at a decreasing acute angle relative to the axes of the screws in the direction of movement of the material in the channel for reducing the tendency of material from backing into and plugging the duct.

14. The twin screw extruder of claim 8 wherein the inlet is adapted for the introduction of dry material into the channel; and wherein the twin screw extruder further comprises, in combination: a second duct for introducing water into the channel upstream of the material plug.

15. The twin screw extruder of claim 14 wherein the first and second screws include a mixing zone intermediate the inlet zone and the material plug for mixing the material, with the second duct introducing the water into the channel within the mixing zone.

16. The twin screw extruder of claim 15 wherein the inlet zone and the mixing zone of the screws are defined by flights, with the inlet having a longitudinal extent within the inlet zone, with the flights of the mixing zone being at a greater pitch than the flights of the inlet zone to generally keep the water introduced through the second duct from entering the inlet zone.

17. The twin screw extruder of claim 14 wherein the first and second ducts extend at a decreasing acute angle relative to the axes of the screws in the direction of movement of the material in the channel for reducing the tendency of material from backing into and plugging the first and second ducts.

18. The twin screw extruder of claim 14 wherein the first and second ducts each include a pair, with the pair located in a plane generally parallel to a plane including both of the axes of the first and second screws.

19. The twin screw extruder of claim 1 wherein the outlet zone is defined by first flights continuous with the operative zone for moving the conditioned material downstream in the channel and second flights for moving the conditioned material upstream in the channel, with the first and second screws including downstream ends, with the second flights extending from the downstream ends of the screws toward the inlet.

20. The twin screw extruder of claim 1 further comprising, in combination: a low shear, low pressure, extended time type cooker having an inlet directly connected to the outlet of the channel.

* * * * *